United States Patent [19]

Kampfer et al.

[11] Patent Number: 4,678,758

[45] Date of Patent: * Jul. 7, 1987

[54] POROUS CERAMIC FILTER BODY AND MANUFACTURING METHOD THEREFOR

[75] Inventors: Konrad Kampfer, Thayngen; Wolfhart Rieger, Buch; Ludwig Gauckler; Marco Dellapina, both of Schaffhausen, all of Switzerland

[73] Assignee: Swiss Aluminum Ltd., Chippis, Switzerland

[ * ] Notice: The portion of the term of this patent subsequent to Jul. 9, 2002 has been disclaimed.

[21] Appl. No.: 668,724

[22] PCT Filed: Jan. 27, 1984

[86] PCT No.: PCT/CH84/00012

§ 371 Date: Oct. 2, 1984

§ 102(e) Date: Oct. 2, 1984

[87] PCT Pub. No.: WO84/03056

PCT Pub. Date: Aug. 16, 1984

[30] Foreign Application Priority Data

Feb. 11, 1983 [CH] Switzerland ............................ 809/83

[51] Int. Cl.$^4$ ........................ C04B 38/08; B01D 39/20
[52] U.S. Cl. ..................................... 501/80; 210/510.1
[58] Field of Search ...................... 210/510.1, 506, 504; 501/80

[56] References Cited

U.S. PATENT DOCUMENTS

| 3,269,850 | 8/1966 | Miller | 501/80 |
| 3,939,079 | 2/1976 | Uchiyama et al. | 210/510.1 |
| 4,251,377 | 2/1981 | Schleinitz | 210/510.1 |
| 4,278,544 | 7/1981 | Takashima | 210/510.1 |
| 4,528,099 | 7/1985 | Rieger et al. | 210/510.1 |

FOREIGN PATENT DOCUMENTS

| 0076781 | 4/1983 | European Pat. Off. | 210/510.1 |
| 57-47757 | 3/1982 | Japan | 264/44 |
| 82/7115 | 8/1983 | South Africa . | |

OTHER PUBLICATIONS

Rankin, G. A. et al., "The Ternary System MgO-Al$_2$O$_3$-SiO$_2$", Am. Journal of Science, vol. XLV, pp. 301–325, Apr. 1918.

Primary Examiner—Mark L. Bell
Attorney, Agent, or Firm—Bachman & LaPointe

[57] ABSTRACT

Ceramic, porous filter body in the designed to overcome the lack of high temperature resistant thermoshock resistant and mechanical stable bodies for the filtration of metals, preferentially of iron and ferrous alloys. This filter body has a temperature resistance of 1600° C., a linear thermal coefficient of expansion of $3-7 \times 10^{-6}/°C$. and consists of hollow spheres based on minimum one homogeneous distributed refractory material and another refractory material, which at high temperature by chemical reaction forms with the hollow spheres a solid refractory binding phase. A process for the production of such a filter body is described such, that the spheres of the refractory materials are mixed with a powderous binding phase, then formed to a porous body and then, by retention of the porous homogeneous structure under formation of new refractory compositions by heat treatment are chemically reacted, at least in the contact areas of the spheres.

15 Claims, 3 Drawing Figures

POROUS CERAMIC FILTER BODY AND MANUFACTURING METHOD THEREFOR

The invention describes a open ceramic, porous filter body for filtration of molten metals, especially iron and iron alloys, and a method to fabricate such a filter body.

Well known are porous ceramic bodys consisting of regular or unregular spherical refractory grains which are formed together with a temporary binder to a porous body and subsequently sintered together with an inorganic binder to a refractory porous material. During the heat treatment the temporary binder is removed. Examples of the application of those filter media are filtration of molten metals especially liquid aluminum.

However, these filter media have only limited temperature stability, if the binding face is a glass consisting of the usual glass components like $Al_2O_3$, $SiO_2$, $B_2O_3$, CaO, MgO and alkali oxides. The temperature stability of the filter media does not exceed the softening point of the bonding glass. In addition the mechanical stability degrades below the softening point of the glass during longer use at high temperatures. These disadvantageous properties are the reasons for the limited usability of such filter media at high temperatures, especially with the use of these materials being impossible in the temperature region of 1000°–1200° C.

The South African Patent No. 82/7115, filed Sept. 29, 1982 and published Aug. 31, 1983 corresponding to German Publication No. 3140098, published Apr. 21, 1983, describes the use of hollow spherical fused alumina as starting material and a reactive alumina powder as a binder to produce such a porous body wherein the powdered alumina bonds together the fused alumina spheres. The disadvantage of this method lies in the high sintering temperatures which are necessary to achieve a bond and therefore lies above 1700° C. Another disadvantage of this method lies in the number of perfect sintering necks which can be achieved by this method which is too low to achieve a strong bond at high temperature. In addition another disadvantage is the high thermal expansion of those porous bodies made out of aluminum oxide which results in a low thermal shock resistance which does not allow the use of this filtration media for filtration of high melting metals especially iron without isothermal preheating which is impossible and impractical in most cases.

This explains why high temperature stable thermal shock resistant porous filter media are not available. Especially there are no porous, mechanically stable, thermal stable and thermal shock resistant filter media available especially for filtration of molten metals in the temperature region up to above 1600° C. The object of the following invention is to overcome this drawback.

The solution to this object is a porous filter media with characteristic of a ceramic, open, porous body for the filtration of metals, preferentially of ferrous alloys and iron, with a temperature resistance of 1600° C., in which the macroscopically homogeneous structure remains unchanged after the temperature treatment of the non-shrinked filter body with a linear coefficient of thermal expansion lying between $3 \times 10^{-6}$ and $7 \times 10^{-6}$/°C., and which is formed from spherical particles of minimum one refractory material in homogeneous distribution and another refractory material as binding phase, which combines at high temperature by chemical reaction with the spheres.

The new material made by the chemical reaction between the binder and the fused alumina spheres is more refractory than the binder alone. The microscopic homogeneous material after sintering has a melting point which lies in between the melting point of the binding material and that of the refractory fused alumina grains before sintering. The grains are bonded together during sintering by chemical reaction without a macroscopic shrinkage of the body. Instead of a volume shrinkage of 20-40 Vol %, which is a normal shrinkage during sintering, the macroscopic structure and the dimensions of the foregoing described body do not change during this sintering with chemical reaction.

One preferred example of the foregoing described body has an open porosity for fluid flow of 25-55 Vol % and a grain size of 0.2 to 3 mm. The spherical grains should have preferably at least one hollow big pore. These pores inside the spherical grains do not contribute to the open porosity of 25 to 55 Vol % for fluid flow through the filter media.

Preferably the refractory material of the spherical particles, of which the resulting body consists, is at least one of the following oxides: magnesium oxide, aluminum oxide, chromium oxide and zirconia, specially fused alumina, zirconia alumina, spinel, mullite, anorthite or celsian, the binding material is at least one of the oxides of magnesium, aluminium, chromium, silicon, titanium, zirconium and silica, specially it consists of magnesium silicate or calcium silicate. In addition to these components the filter media can contain as a temporary binding agent a glassy phase in a minor amount. In addition it may be of an advantage that the filter media contains zirconia as one component.

The invention is based on the observation, that the refractory grains and the binding phase react during the sintering stage in such a way that a homogeneous microstructure with a homogeneous composition of at least two evenly distributed phases is obtained after sintering.

The described invention consists in the method of making a ceramic porous filter media, especially for the filtration of iron and iron alloys in such a way that spherical grains of a refractory material and a powdered binding phase are mixed and formed to a body with pores, sintered to form a stable homogeneous open porous structure by a chemical reaction of the binding phase and the refractory grains without a macroscopic shrinkage of the filter body itself during the filtering step and without a geometrical change of the pore structure inside the body which is relevant for liquid filtration and usable at high temperatures.

State of the art of sintering describes that sintering always is connected with a shrinakge of the sintered body. However, the described invention alloys a sintering with chemical reaction without a shrinkage and without a geometrical change of the inside geometric structure of the used refractory grains and therefore of the inner microstructure of the porous body.

It is an advantage to use refractory grains of a medium diameter of 0.2 to 8 mm, especially grains between 0.5-5 mm. Sintering is preferably done in the temperature range from 1400°–1700° C., preferably between 1500° and 1600° C. Holding time at the maximum temperature is preferably between 15 and 120 minutes.

It is an advantage to use fused aluminum oxide hollow spheres of fused hollow spheres made out of aluminum oxide/zirconia or zirconia alone. In addition it is preferred to use a magnesium oxide silicate containing binding material especially a mixture of forsterite and enstatite, and if calcia containing binding materials are chosen, calcium silicate especially wollastonite is preferred.

The described invention comprises that the refractory components used for sintering with a chemical reaction are mixed in a specific ratio. It could be shown that the specific mixing ratios are necessary to obtain a filter media with the desired properties as well as the property to sinter without dimensional change at high temperature and retaining high strength at temperatures from room temperature up to above 1600° C.

The preferable weight ratio between fused alumina and magnesia silicate is 55:45 up to 80:20 especially 60:40 up to 45:25 especially fused alumina and wollastonite in a weight ratio in the range of 90:10 up to 70:30 especially 85:15 up to 75:25. If hollow spheres of zirconia-alumina and magnesia-silicate are used the ratio of both components is preferably in the region of 50:50 up to 85:15 especially 65:35 up to 75:25.

If the grain component is described with A, and the binding phase with B as starting material, and the final product which is obtained by the chemical reaction during sintering between A and B is designated C, we obtained the following extreme possibilities:

If the amount of A is too high, then the reaction can only occur to give the mixed product C at very high temperatures. It could be shown that those bodies with an A rich mixed product C showed a low strength and low thermal shock resistance.

In the other case if the amount of B is too high, then the reaction with A occurs in such a way that the internal microstructure as well as the position of the grains to each other is not retained and the final body consisting of material C changes dimensions and deforms during sintering so that the internal porosity as well as the internal pore size is changed in an uncontrollable manner resulting in a high shrinkage and a deformed body.

Both methods do not lead to a body described according to this invention.

EXAMPLES

The following mixtures were produced out of the component A—hollow fused alumina, hollow fused zirconia-alumina—and the component B—magnesium silicate and calcia-silicate—and afterwards sintered.

EXAMPLE 1

Hollow fused alumina spheres of 2 to 5 mm in diameter were mixed during 5 min with magnesium silicate ($3MgO.4SiO_2$) in the weight-ratios 15:85, 25:75, 30:70, 35:65, 40:60, 45:55 and 50:50 adding an organic binder (Optapix) and water. Mixing was done gently in drum mixer. Subsequent the mixture is formed in a cylindrical die of 100 mm in diameter and 35 mm in height under gently tapping. Drying was done at 80° C. for 24 hrs in the die, afterwards the green body without die was sintered at 1650° C., holding time was 2 h and subsequently cooled down to room temperature. Heating and cooling time was in between 1 to 72 hrs. The ceramic bodies were examined by optical and X-ray methods macroscopically and microscopically. The results are shown in table 1. It is obvious that samples 1 and 7 are not suitable for being used as filter media. Sample 1 has insufficient strength whereas sample 7 shows too high shrinkage.

According to the results of table 1 good filter media are obtained in the composition range of 75 to 60 wt % of component A. Amounts of component A higher than that led to insufficient binding force whereas increased amounts of component B led to heavy shrinkage and deformation of the macroscopic pores needed for filtration and deformation of the hollow spheres. Bodies with sufficient properties for being used as molten metal filters were obtained in the ranges of 60:40 to 75:25 weight ratios between hollow fused alumina and magnesium silicate.

EXAMPLE 2

Mixtures of hollow fused alumina (component A) and wollastonite, $CaO.SiO_2$ (component B) were produced, formed and fired at 1600° C. according to example 1.

Results are shown in table 2. Samples 2 to 6 are suitable for being used as filters for molten metal. Exceptional good results were obtained with the samples 3, 4 and 5 with weight ratios of fused alumina to wollastonite of 85:15 up to 75:25.

EXAMPLE 3

According to the foregoing described examples a mixture was prepared using 1000 grams fused alumina spheres of 2 to 5 mm in diameter, 300 g magnesium silicate ($3MgO.4SiO_2$), 140 g water and 60 g of an organic binder (Polysacharid) by mixing in a drum mixer for 5 minutes.

Subsequently the mixture was formed in an aluminum die of 100 mm in diameter and 35 mm hight by gently tapping the die. Drying was done at 80° C. for 24 h. After forming the dried green body was fired at 1650° C. for 2 h heating and cooling can be done between 1 and 72 h.

The so produced product was without any cracks, without any change in dimensions, of high strength and did not show any change in the pore structure compared to the green body.

The examination of the sintered body showed that despite no change in the pore structure, the microstructure of the material of the spheres of the sintered body has changed drastically compared to the alumina spheres of the starting material. Optical microscopy and X-ray-diffractionwise the following phases were identified: Spinel, alpha-alumina, Mullite and a minor amount of glassy grain boundary material. The crystalline phases were distributed homogeneously throughout the microstructure. During sintering a chemical reaction has taken place between the hollow alpha-alumina spheres and the magnesium silicate.

Without preheating the foregoing described filter body was used for filtering molten iron at a temperature of 1500° C. During 2 minutes 40 kg molten iron passed the filter. After this test the filter did not show any change compared to the structure before filtration. The filter did not show any dimensional change or fracture of the grains. The amount of metal resting in the filter after filtration was minor, showing a good isolation property of the filter. Oxide and sulfide particles from the iron melt could be detected on the surface of the filter. In contrast to these observations, the filtered iron did not show any oxide or sulfide or other slag impurities and no particles or materials from the filter. The filtered iron was free of all solid particles.

EXAMPLE 4

Hollow fused alumina spheres of diameter 0.2–1 mm were mixed with 10 wt % of a mixture consisting of 48 wt % aluminum-oxide and 54 wt % silica adding an organic binder (Optapix) and water and processed as described before up to sintering which was done at 1700° C. for 1 h.

The resulting body was optically and X-ray-wise investigated. The analysis showed the phases Mullite and alpha-corundum. High temperature bend strength was performed using specimens of 50×5 mm in 3-point-bending mode. A high temperature bend strength of 30 N/cm$^2$ at 1200° C. and of 1 N/cm$^2$ at 1700° C. were detected. Bend strength at room temperature was 300 N/cm$^2$. The mentioned bend strength values at high temperature are sufficient for steel filtration.

spheres. The strength of those bodies was sufficient, volume change during sintering was not observed.

Additional advantages, specific properties and details of the described inventive ceramic filter media are demonstrated by the following microstructure:

TABLE 1

Figure 1:
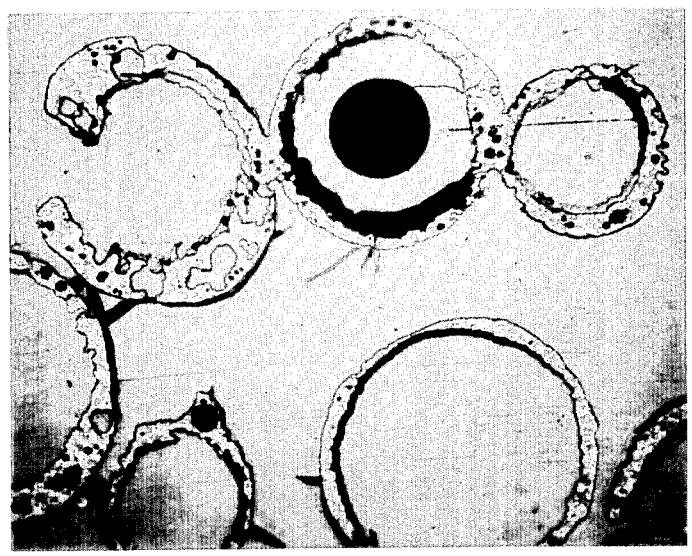
FIG. 1 shows a microstructure of a filter media consisting of hollow fused alumina spheres of the grain size 2 to 5 mm in diameter and 30% magnesia silicate after the reaction at 1650° C. at a magnification of 12.8×.
Figure 2:
FIG. 2 is a magnified part of FIG. 1 in magnification of 32×.
Figure 3:
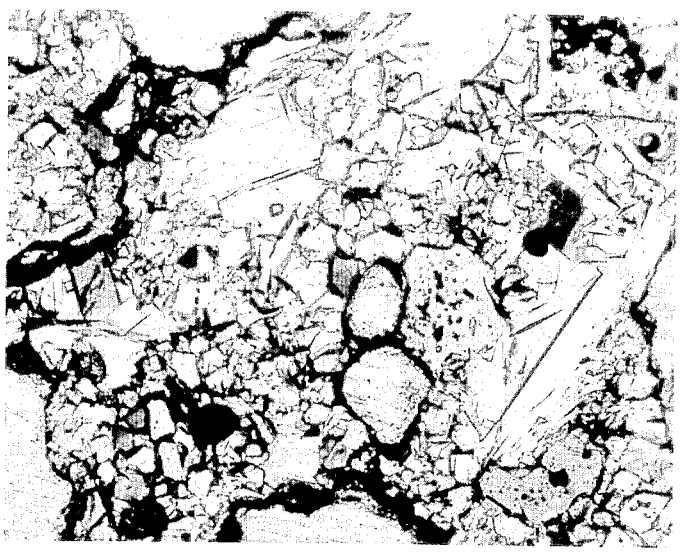
FIG. 3 shows a enlarged section of FIG. 2 at a magnification of 160×.

| Mixture No. | Component A Hollow fused alumina (%) | Component B Magnesium silicate (%) | Linear Shrinkage % | Strength | Change in Structure | Stucture of sphere packing | Phases X-ray diffraction |
|---|---|---|---|---|---|---|---|
| 1 | 85 | 15 | 0 | bad | none | unchanged | α + G + M |
| 2 | 75 | 25 | 0 | good | none | unchanged | α + M + Sp + G |
| 3 | 70 | 30 | 0 | good | none | unchanged | α + M + Sp + G |
| 4 | 65 | 35 | 0 | good | none | unchanged | α + M + Sp + G |
| 5 | 60 | 40 | 0 | good | none | unchanged | α + M + G |
| 6 | 55 | 45 | 10 | good | some | slightly ch. | α + G |
| 7 | 50 | 50 | 32 | good | molten | very much changed | α + G |

α = Alpha-Al$_2$O$_3$
M = Mullite (3Al$_2$.2SiO$_2$)
Sp = Spinel (MgAl$_2$O$_4$)
G = Glass Phase

TABLE 2

| Mixture | Component A Hollow fused alumina (%) | Component B Calcium silicate (%) | Linear Shrinkage % | Strength | Change in Structure | Stucture of sphere packing | Phases X-ray diffraction |
|---|---|---|---|---|---|---|---|
| 1 | 95 | 5 | 0 | bad | none | unchanged | α |
| 2 | 90 | 10 | 0 | sufficient | none | unchanged | α + Q |
| 3 | 85 | 15 | 0 | good | none | unchanged | α + An + Q |
| 4 | 80 | 20 | 0 | good | none | unchanged | α + An + Q |
| 5 | 75 | 25 | 0 | good | none | unchanged | α + An + Q |
| 6 | 70 | 30 | 15 | good | some | changed | α + An + Q |
| 7 | 65 | 35 | 35 | good | molten | very much changed | An + α + Q |

α = Alpha-Al$_2$O$_3$
An = Anorthite
Q = Alpha-quartz

EXAMPLE 5

Hollow fused alumina grains of diameter 2 to 5 mm were mixed as described in the examples 1 to 3 with 20 wt % zirconium oxide and silica in a ratio by weight of 1:1. Sintering temperature was 1650° C. X-ray diffraction analysis showed the existence of the phases alpha-alumina, zirconia, zircon and Mullite. According to the optical analysis a reaction between the fused alumina grains and the other components has taken place only at the surface of the hollow fused alumina grains. The strength of those bodies at room temperature also was sufficient for use as filter medium. No shrinkage was observed during sintering.

EXAMPLE 6

Hollow fused alumina of the diameter 2 to 8 mm were mixed as described in the examples 1 to 3 together with 20 wt % zircon and 10 wt % talc. Sintering of this mixture which was processed as described before was done at 1650° C.

X-ray diffraction analysis showed the phases alpha-alumina, zirconia, zircon, Mullite as well as glassy phase which was detected by optical microscopy. The latter also showed that the reaction has proceeded through the whole wall thickness of the hollow fused alumina

What is claimed is:

1. Cermaic, open, porous body for the filtration of metals which comprises a sintered porous body having a macroscopically homogeneous structure and a temperature resistance of at least 1600° C. with a linear coefficient of thermal expansion lying between $3 \times 10^{-6}$ and $7 \times 10^{-6}$/°C., wherein said porous body is formed from (A) hollow fused spherical particles having at least one void of minimum one refractory material in homogeneous distribution, and (B) another refractory material different from the refractory phase material of the spherical particles in powder form as binding phase which combines during sintering at high temperature by chemical reaction with the spherical particles to form a still further refractory phase (C) which is more refractory than said binding phase and is homogeneously distributed throughout the porous body, wherein after the sintering temperature treatment said porous body retains a macroscopically homogeneous structure without a macroscopic shrinkage.

2. Ceramic filter body according to claim 1 in which the open porosity lies between 25 and 55% and the grain size of the spheres is in between 0.2 to 8 mm.

3. Ceramic filter body according to claim 2 wherein said grain size is between 0.5–5 mm.

4. Ceramic filter body according to claim 2 in which the refractory material of the spherical particle consists of a material selected from the group consisting of the oxides of magnesium, aluminum, chromium, zirconium and mixtures thereof, and in which the binding phase consists of a material selected from the group consisting of the oxides of magnesium, calcium, barium, aluminum, silicon, titanium, zirconium and mixtures thereof.

5. Ceramic filter body according to claim 4 wherein said binding phase consists of a material selected from the group consisting of magnesium silicate, calcium silicate and mixtures thereof.

6. Ceramic filter body according to claim 1 in which additionally as a temporary binding phase a glass phase is present in a quantity, which is minor with respect to the spherical particle refractory and binding material and which contains a material selected from the group consisting of zirconium silicate and zirconia.

7. Process for the production of a ceramic, open, porous body for the filtration of metals which comprises mixing together (A) hollow spherical particles having at least one void of minimum one refractory phase material and (B) another powdered refractory material different from the refractory phase material of the spherical particles binding phase which combines at high temperature by chemical reaction with the spherical particles, forming said mixture into a porous body, and sintering said formed porous body at a high temperature with retention of a macroscopic homogeneous structure to form (C) new refractory phase compounds by chemical reaction at least in the area of contact of the spheres and to form an unshrinked, homogeneous porous structure with a linear coefficient of thermal expansion lying between $3 \times 10^{-6}$ and $7 \times 10^{-6}/°C$. wherein the new refractory phase is more refractory than said binding phase and is homogeneously distributed throughout the porous body.

8. Process according to claim 7 in which the temperature treatment is performed at 1400°–1700° C., and the holding time at maximum temperature lies in between 15 and 120 minutes.

9. Process according to claim 8 wherein the temperature treatment is from 1500°–1600° C.

10. Process according to claim 7 wherein hollow alumina spheres and magnesium silicate as binding phase are used as reactants and the weight relation of the hollow alumina spheres to the magnesium silicate lies between 55:45 to 80:20.

11. Process according to claim 10 wherein said weight relationship lies between 60:40 to 75:25.

12. Process according to claim 7 wherein hollow alumina spheres and wollastonite as binding phase are used as reactants and the weight relation of the hollow alumina spheres to wollastonite lies between 90:10 to 70:30.

13. Process according to claim 12 wherein said weight relationship lies between 85:15 to 75:25.

14. Process according to claim 7 wherein spheres of zirconia-alumina and magnesium silicate as binding phase are used as reactants and the weight relation of the zirconia-alumina to magnesium silica lies between 50:50 to 85:15.

15. Process according to claim 14 wherein said weight relationship lies between 65:35 to 75:25.

* * * * *

UNITED STATES PATENT AND TRADEMARK OFFICE
CERTIFICATE OF CORRECTION

PATENT NO. : 4,678,758

DATED : July 7, 1987

INVENTOR(S) : KONRAD KAMPFER ET AL.

It is certified that error appears in the above-identified patent and that said Letters Patent is hereby corrected as shown below:

```
Column 6, claim 1, line 45, change "Cermaic"
to read --Ceramic--.

Column 6, claim 1, line 52, after "refractory"
insert --phase--.

Column 7, claim 4, line 8, delete "silicon"
and insert --silicium--.
```

Signed and Sealed this

Ninth Day of February, 1988

Attest:

DONALD J. QUIGG

Attesting Officer

Commissioner of Patents and Trademarks